United States Patent [19]

Saito et al.

[11] Patent Number: 4,753,970

[45] Date of Patent: Jun. 28, 1988

[54] FIRE-RETARDANT POLYOLEFIN COMPOSITION

[75] Inventors: Hiroyasu Saito, Iwaki; Shun Suzuki, Toride; Fumio Tanimoto, Kyoto; Hisao Kitano, Osaka, all of Japan

[73] Assignee: Nippon Kasei Chemical Co., Ltd., Iwaki, Japan

[21] Appl. No.: 897,931

[22] Filed: Aug. 19, 1986

[30] Foreign Application Priority Data

Apr. 21, 1986 [JP] Japan .................................. 61-91665
Jul. 1, 1986 [JP] Japan ................................. 61-154584

[51] Int. Cl.$^4$ ........................... C08K 5/06; C08K 5/15; C08K 5/41
[52] U.S. Cl. .................................... 524/101; 524/171; 524/281; 524/373
[58] Field of Search ............... 524/280, 281, 101, 373, 524/171

[56] References Cited

U.S. PATENT DOCUMENTS

| | | | |
|---|---|---|---|
| 3,624,252 | 11/1971 | Labarge | 524/101 |
| 3,846,469 | 11/1974 | Gunsher et al. | 524/281 |
| 3,855,277 | 12/1974 | Fox | 524/409 |
| 3,883,481 | 5/1975 | Kopetz et al. | 524/373 |
| 3,931,274 | 1/1976 | Thomas et al. | 558/268 |
| 4,104,217 | 8/1978 | Leistner et al. | 524/281 |
| 4,209,431 | 6/1980 | Clark et al. | 524/281 |
| 4,255,301 | 3/1981 | Minagawa et al. | 524/280 |
| 4,331,780 | 5/1982 | Brady | 524/101 |
| 4,414,396 | 11/1983 | Boyer | 548/479 |

FOREIGN PATENT DOCUMENTS 2168707 6/1987 United Kingdom .

*Primary Examiner*—Veronica P. Hoke
*Attorney, Agent, or Firm*—Oblon, Fisher, Spivak, McClelland & Maier

[57] ABSTRACT

Disclosed herein is a novel fire-retardant polyolefin composition comprising a polyolefin, an organohalogenous fire retardant and a carbonic acid ester represented by the formula (I):

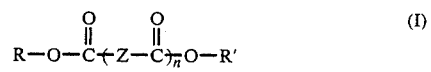

wherein R and R' respectively represent an alkyl group, an alkenyl group, an alkynyl group, a cycloalkyl group, an aralkyl group or an aryl group, Z represents a residual group of an aliphatic diol, an alicyclic diol, an aromatic diol, a diphenyl ketone diol, or a diphenylsulfone diol and n is 0 or 1.

5 Claims, 1 Drawing Sheet

FIRE-RETARDANT POLYOLEFIN COMPOSITION

BACKGROUND OF THE INVENTION

The present invention relates to a fire-retardant polyolefin composition. More in detail, the present invention relates to a fire-retardant polyolefin composition comprising a polyolefin, an organohalogenous fire retardant and a carbonic acid ester represented by the formula (I):

$$R-O-C(=O)+Z-C(=O)+_n O-R' \quad (I)$$

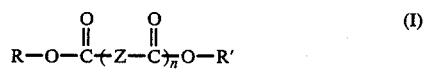

wherein R and R' respectively represent an alkyl group, an alkenyl group, an alkynyl group, a cycloalkyl group, an aralkyl group or an aryl group, Z represents a residual group of an aliphatic diol, an alicyclic diol, an aromatic diol, a diphenyl ketone diol, or a diphenylsulfone diol and n is 0 or 1.

Since polyolefins are high in strength, excellent in electrical insulation and easily subjected to molding, polyolefins are used in a broad field as constructional materials, materials for electrical equipments, etc., however, they have a defect that they are combustible and easy to catch fire.

Accordingly, in order to obtain fire-retardant polyolefins, methods of adding various halogen compounds, particularly an organohalogen compound as a fire retardant to polyolefins have been proposed, however, any fire retardant which is excellent in fire retardance and low in bleeding has not been supplied. For instance, as a fire retardant for polyolefin, etherified tetrabromobisphenol A has been proposed (refer to Japanese Patent Publication No. 45-9645(1970)). However, although etherified tetrabromobisphenol A is low in bleeding as compared with other fire retardant, the bleeding is caused in the case of adding a large amount thereof to polyolefin in order to increase a fire retardant property. In order to improve such a situation, a method of using chlorinated polyethylene together with etherified tetrabromobisphenol A has been proposed (refer to Japanese Patent Publication No. 50-23064(1975)), however, chlorinated polyethylene is low in fire retardance and is thermally deteriorated at thermal molding, thereby resulting in bleeding and coloration of the molded articles.

Further, the polyolefin composition containing a derivative of tetrahalogenodiphenylsulfone as the fire retardant (refer to Japanese Patent Publication No. 50-35103(1975)) is poor in the workability on molding and is still insufficient in bleed-preventing effect, and the polypropylene composition containing etherified tetrabromobisphenol A and tetrabromobisphenol A polycarbonate (refer to Japanese Patent Publication No. 55-41698(1980)) causes bleeding in the case of adding a large amount of the above fire retardant to increase a fire retardant property. Also the polypropylene composition containing etherified tetrabromobisphenol A, etherified tetrabromobisphenol S and/or tris(2,3-dibromopropyl)isocyanurate (refer to Japanese Patent Application Laying-Open (KOKAI) No. 57-73032 (1982)) is still insufficient in bleed-preventing effect.

In the case where the prevention of bleeding is insufficient in the composition, the fire retardant bleeds to the surface of the molded article, thereby causing blooms. The molded articles having the blooms of the fire retardant become to be inferior in the fire retardance thereof. It is not only unfavorable from the viewpoint of the physical properties of the molded articles but also the appearance of the molded articles is deteriorated. Namely, the blooming remarkably reduces the commercial merit of the molded articles by the reason that the blooms scatter from the surface of the molded articles and injure the human body.

It is considered that the bleeding is caused by the separation of the fire retardant and polyolefin to each other due to the poor compatibility of the two materials.

As a result of the present inventors' studies based on the idea that a component compatible to both organohalogenous fire retardant and polyolefin may be able to prevent the bleeding, the present inventors have found that a carbonic acid ester represented by the formula (I):

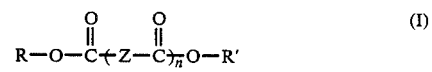

wherein R and R' respectively represent an alkyl group, an alkenyl group, an alkynyl group, a cycloalkyl group, an aralkyl group or an aryl group; Z represents a residual group of an aliphatic diol, an alicyclic diol, an aromatic diol, a diphenyl ketone diol or a diphenylsulfone diol and n represents 0 or 1, is compatible to both polyolefin and organohalogenous fire retardant, and the addition of the carbonic acid ester represented by the formula (I) to the conventional composition comprising polyolefin and an organohalogenous fire retardant remarkably reduces the bleeding of the fire retardant from the molded article without causing the reduction of fire retardance, mechanical strength and electrical characteristics of the molded articles.

On the basis of the findings, the present inventors have attained the present invention.

SUMMARY OF THE INVENTION

In an aspect of the present invention, there is provided a fire-retardant polyolefin composition comprising polyolefin, organohalogenous fire retardant and carbonic acid ester represented by the formula (I):

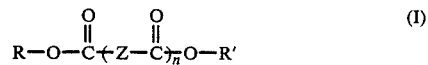

wherein R and R' respectively represent an alkyl group, an alkenyl group, an alkynyl group, a cycloalkyl group, an aralkyl group or an aryl group, Z represents a residual group of an aliphatic diol, an alicyclic diol, an aromatic diol, a diphenyl ketone diol, or a diphenylsulfone diol and n represents 0 or 1.

DETAILED DESCRIPTION OF THE INVENTION

Figure 1:
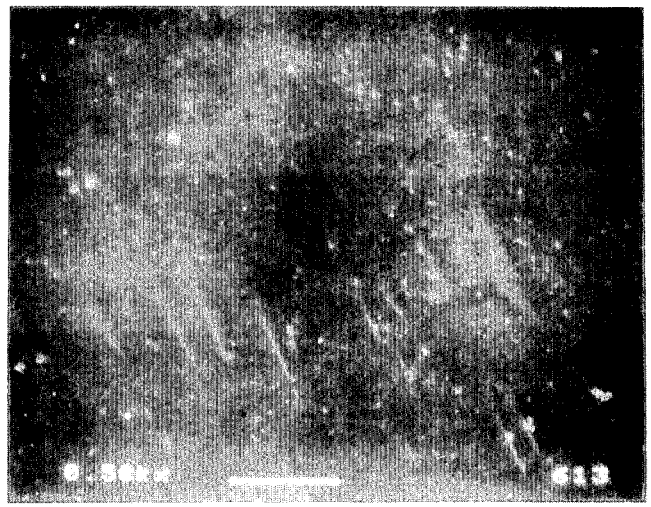
FIGS. 1 and 2 are photographs (×400) showing the surface of the test piece heated for 96 hours in an oven at 90° C. of EXAMPLE 1 and COMPARATIVE EXAMPLE 1, respectively.

The present invention relates to a fire-retardant polyolefin composition obtained by mixing a carbonate ester having a compatibility to both polyolefin and an organohalogenous fire retardant with a conventional composition comprising polyolefin and an organohalogenous fire retardant.

The carbonic acid ester according to the present invention is represented by the formula (I):

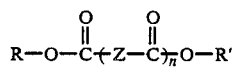

wherein R and R' may be the same or different substituent and represent respectively an alkyl group, an alkenyl group, an alkynyl group, a cycloalkyl group, an aralkyl group or an aryl group.

Among the above groups for R and R', alkyl group of 1 to 4 carbon atoms such as —CH₃, —C₂H₅ and —C₄H₉, alkenyl group of 3 to 5 carbon atoms such as —CH₂CH═CH₂, alkynyl group of 3 to 5 carbon atoms such as —CH₂C≡CH, cycloalkyl group of 3 to 6 carbon atoms such as

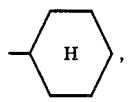

aralkyl group of such as

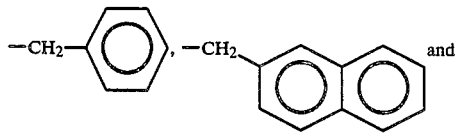

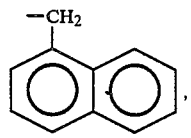

and aryl group such as

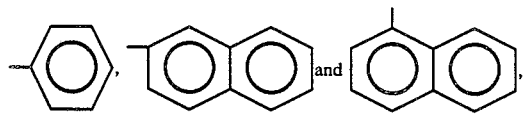

are preferable.

Z represents a residual group of an aliphatic diol, an alicyclic diol, an aromatic diol, a diphenyl ketone diol or a diphenylsulfone diol, and n represents 0 or 1.

As the residual group of aliphatic diols, —O—CH₂CH₂—O— and —O—CH₂CH₂—O—CH₂C₂—O—, as the residual group of alicyclic diols,

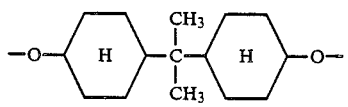

and

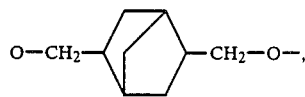

as the residual group of aromatic diols,

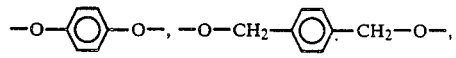

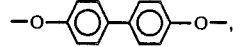

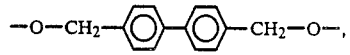

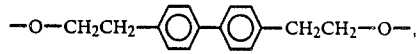

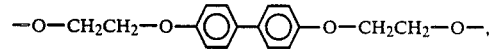

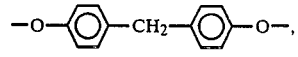

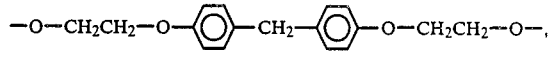

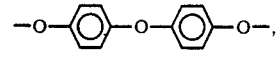

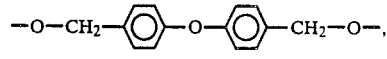

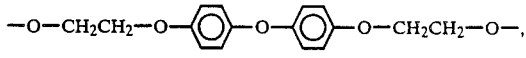

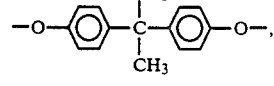

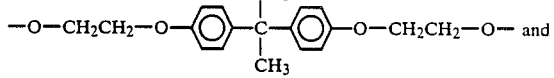 and

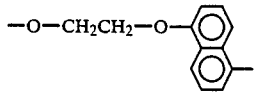

as the residual group of diphenyl ketone diol,

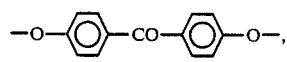

-continued

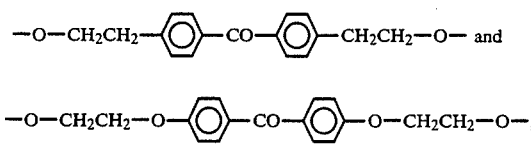
and

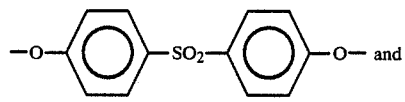

and as the residual group of diphenylsulfone diol,

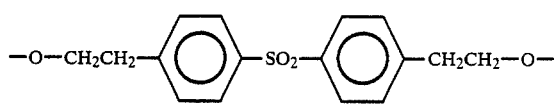
and

-continued

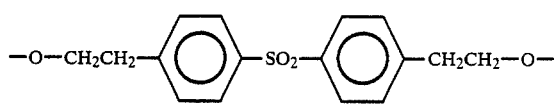

may be exemplified.

As the carbonic acid ester, those which are less volatile and are liquid at the molding temperature of the polyolefin composition (180° to 220° C.) are preferable. Accordingly, the carbonic acid ester which are solid at ordinary temperature (25° C.) and have the melting point of not higher than 220° C. even if they are solid at ordinary temperature are preferably used.

As the carbonic acid ester, for instance, the following are exemplified.

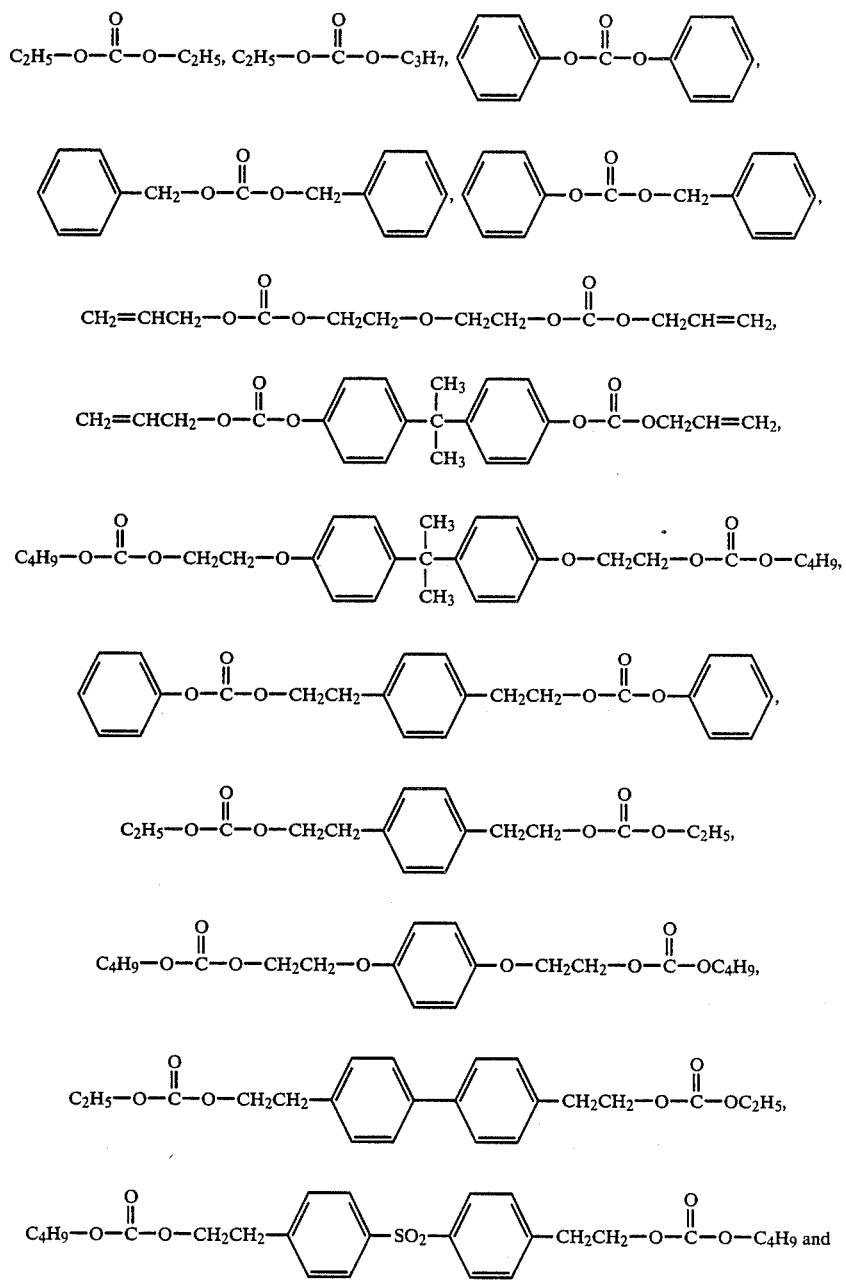

-continued

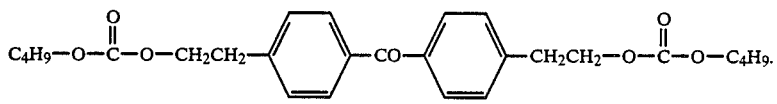

Among the carbonic acid esters exemplified above,

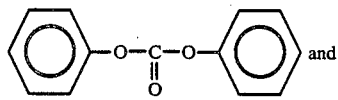 and

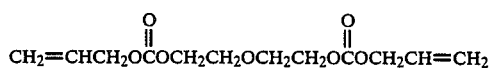

are preferable.

As the polyolefin constituting the composition according to the present invention, crystalline thermoplastic polyolefin, non-crystalline thermoplastic polyolefin and various modified polyolefin obtained by subjecting the above-mentioned polyolefins to chemical and/or physical treatment may be used. For instance, high pressure polyethylene, medium pressure polyethylene, low pressure polyethylene, isotactic polypropylene, syndiotactic polypropylene, atactic polypropylene, polybutene, modified polyethylene obtained by grafting maleic anhydride, fumaric acid, acrylic acid, methacrylic acid, etc. to polyethylene may be exemplified. Further, random copolymer of ethylene and α-olefin, block copolymer thereof, copolymers of ethylene or α-olefin and another vinyl monomer and alternating copolymer of ethylene or α-olefin and a conjugated diene may be used. As the examples of the above-mentioned copolymers, copolymers of ethylene and propylene, copolymers of ethylene and vinyl acetate, copolymers of ethylene and acrylic acid, copolymers of ethylene and methacrylic acid, alternating copolymers of propylene and butadiene, copolymers of ethylene and diallyl ester may be mentioned.

As the organohalogenous fire retardant of the present invention, various publicly known organohalogenous fire retardants may be used. For instance, hexabromobenzene, decabromobiphenyl, decabromobiphenyl ether, tetrabromobisphenol A, hexabromocyclododecane, dodecachloropentacyclodecane, 2,2-bis[3,5-dibromo-4-(allyloxy)phenyl]propane, 2,2-bis[3,5-dibromo-4-(2,3-dibromopropoxy)phenyl]propane, tris-(2,3-dibromopropyl)-isocyanurate, 1,1'-sulfonylbis[3,5-dibromo-4-(2,3-dibromopropoxy)]benzene, etc., may be mentioned.

In the polyolefin composition according to the present invention, the organohalogenous fire retardant is generally contained in an amount of, as the halogen atoms, from 1 to 40 parts by weight, preferably from 5 to 30 parts by weight per 100 parts by weight of polyolefin.

The amount of the carbonic acid ester to be added depends on the kinds of polyolefin and the kinds and addition amounts of the organohalogenous fire retardant, however, in general, it is added from 1 to 5 parts by weight, preferably from 1.3 to 4 parts by weight and more preferably from 1.5 to 3 parts by weight per 100 parts by weight of polyolefin. In the case where the amount of addition of the carbonic acid ester is below 1 part by weight, the bleed-preventing effect is small, and on the other hand, even in the case of over 5 parts by weight, the bleed-preventing effect is not remarkably improved.

The composition according to the present invention (hereinafter referred to as the present composition) may be produced according to a publicly known method, for example by blending and kneading polyolefin, the fire retardant and the carbonic acid ester under heating while using a mixing machine such as mixing rolls, calender rolls, kneader, extruder, etc. The fire retardant and the carbonic acid ester may be added to polyolefin after previously mixed together. In the case of blending and kneading, of course, there are no trouble in adding fillers, stabilizers, antioxidants, ultraviolet absorber, pigments, lubricants or auxiliary fire retardants ordinarily used together with the organohalogenous fire retardant such as antimony oxide, aluminum hydroxide, magnesium hydroxide, etc.

As has been described above, according to the present invention, by adding the carbonic acid ester represented by the formula (I) to a conventional polyolefin composition comprising the organohalogenous fire retardant and polyolefin a fire-retardant polyolefin composition of low bleeding of the fire retardant is available without causing any reduction in the fire retardance, the electrical characteristics and mechanical strength of the conventional polyolefin composition.

Such an extremely low bleeding and fire-retardant polyolefin composition according to the present invention is preferably utilized for coverings of the electric wires, housings of the various electronic and electrical equipment, caps of electric bulbs, etc.

The present invention will be explained more precisely while referring to the following non-limitative Examples.

EXAMPLE 1

One hundred parts by weight of polypropylene (NOVATEC® P-4500J made by MITSUBISHI Chemical Ind. Ltd.), 1 part by weight of basic magnesium aluminum hydroxycarbonate (DHT-4A-2 made by KYOWA Chem. Ind. Co., Ltd.) as a stabilizer, 1.5 parts by weight of carbon black (N-760 made by MITSUBISHI Chem. Ind. Ltd.), 7 parts by weight of antimony trioxide, 7 parts by weight of 2,2-bis(3,5-dibromo-4-(2,3-dibromopropoxy)phenyl)propane and 7 parts by weight of tris(2,3-dibromopropyl)isocyanurate as a fire retardant, and 3 parts by weight of diphenyl carbonate as a carbonic acid ester were mixed and kneaded while using a biaxial extruder (PCM-30 made by IKEGAI TEKKO Co., Ltd.) at 200° C., and the thus mixed and kneaded material was molded into test pieces for testing the bleeding property, the fire retardance, the electrical characteristics and the tensile strength while using an injection molding machine (SN-45 made by NIIGATA TEKKOSHO Co., Ltd.) at 210° C.

In addition, the test for bleeding property was carried out by observing with naked eyes the surface of the test piece which had been heated for 96 hours in an oven at 90° C. and then cooled to room temperature. The degree of bleeding was obtained by calculation according to the following formula:

$$\text{Degree of bleeding} = \frac{A - B}{C} \times 100$$

wherein A is the weight of the test piece of 12 mm in width, 125 mm in length and 3 mm in thickness, B is the weight of the same test piece which had been heated for 7 days in a gear oven at 100° C. and then wiped with a piece of gause wetted by benzene on the surface thereof and C was the weight of the amount of the fire retardant in the test piece.

The test for flammability was carried out according to the method of UL-94 test method of UL-Standards and that of Japanese Industrial Standards (JIS) K 7201 (oxygen index method), and the tensile strength was measured according to Japanese Industrial Standards K-5301.

Electrical characteristics was measured using the test pieces of 50 mm in length, 50 mm in width and 2 mm in thickness at 500 V of direct current for measuring the surface specific resistance and the volume specific resistance and at 5 V of alternating current (1 kHz) for measuring the dielectric constant and the dissipation factor.

The results are shown in Table 1 and the photograph of the surface of the test piece heated for 96 hours at 90° C. is shown in FIG. 1.

As seen from FIG. 1, blooms caused by bleeding were hardly observed.

EXAMPLES 2 TO 6

In the same manner as in Example 1 except for using 3 parts by weight of each of the carbonic acid esters shown in Table 1 instead of using diphenyl carbonate of Example 1, each of the test pieces were prepared, and the thus prepared test pieces were tested as in Example 1, the results being also shown in Table 1.

COMPARATIVE EXAMPLE 1

Figure 2:
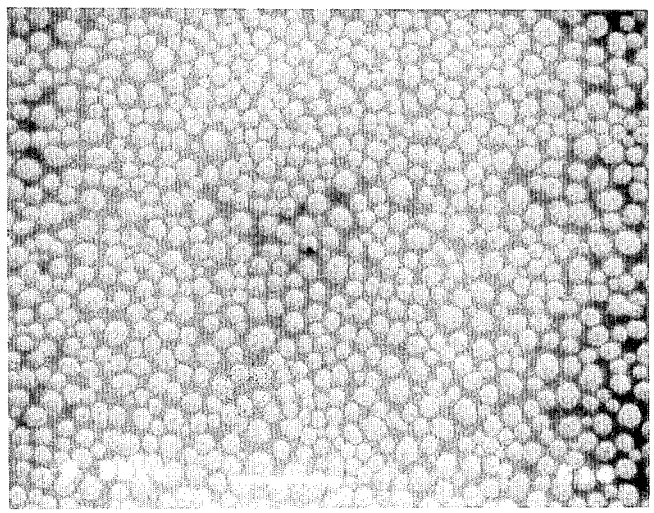

In the same manner as in Example 1 except for not adding any carbonic acid ester, each of the test pieces was prepared, and the thus prepared test pieces were tested as in Example 1, the results being shown in Table 1 and the photograph of the surface of the test piece heated for 96 hours at 90° C. being shown in FIG. 2.

As seen from FIG. 2, considerable blooms caused by bleeding were observed.

EXAMPLES 7 TO 12

Each of the test pieces were prepared by using 100 parts by weight of polyethylene (ET-010M made by MITSUBISHI Chem. Ind. Ltd.), 40 parts by weight of decabromobiphenyl ether as the fire retardant, 20 parts by weight of antimony trioxide, 0.5 part by weight of an ultraviolet absorber of benzotriazole (TINUBIN® P-326 made by CIBA-GEYGY Co.), 0.1 part by weight of an antioxidant of hindered phenyl (IRGANOX®-1010 made by CIBA-GEYGY Co.) and 3 parts by weight of each one of the carbonic acid esters shown in Table 2 while using the same manner as in Example 1. The thus prepared test pieces were subjected to the same tests as in Example 1, the results being shown also in Table 2.

COMPARATIVE EXAMPLE 2

In the same manner as in Example 7 except for not using any carbonic acid ester, each of the test pieces was prepared, and the thus prepared test pieces were tested as in Example 1, the results being shown in Table 2.

TABLE 1

| Example | Carbonic Acid Ester | Bleeding tendency | Degree of Bleeding (%) |
|---|---|---|---|
| COMPARATIVE EXAMPLE 1 | not used | yes | 1.97 |
| EXAMPLE 1 | 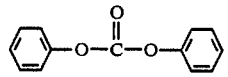 | no | 0.01 |
| EXAMPLE 2 | 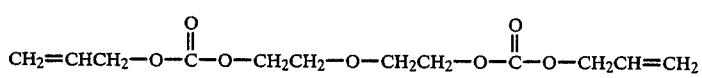 | no | 0.01 |
| EXAMPLE 3 | 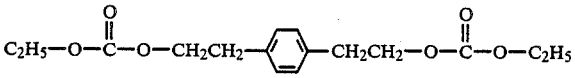 | no | 0.01 |
| EXAMPLE 4 | 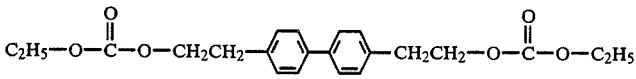 | no | 0.01 |
| EXAMPLE 5 | 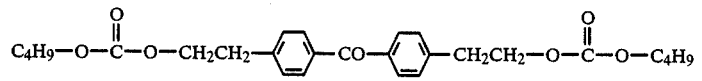 | no | 0.01 |
| EXAMPLE 6 | 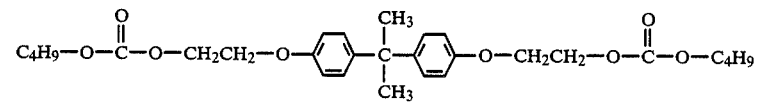 | no | 0.01 |

| Example | Fire Retardance UL-94 | Oxygen index (%) | Surface specific resistance ($\Omega$) | Volume specific resistance ($\Omega \cdot cm$) | Dielectric constant | Dissipation factor (%) | Tensile strength (kg/mm$^2$) |
|---|---|---|---|---|---|---|---|
| COMPARATIVE EXAMPLE 1 | V-0 | 31.5 | $9.5 \times 10^{15}$ | $4.4 \times 10^{16}$ | 2.40 | 0.30 | 3.05 |

TABLE 1-continued

| | | | | | | | |
|---|---|---|---|---|---|---|---|
| EXAMPLE 1 | V-0 | 31.0 | $8.2 \times 10^{15}$ | $2.2 \times 10^{16}$ | 2.38 | 0.42 | 2.85 |
| EXAMPLE 2 | V-0 | 31.0 | $5.6 \times 10^{15}$ | $2.9 \times 10^{16}$ | 2.44 | 0.31 | 2.90 |
| EXAMPLE 3 | V-0 | 30.5 | $4.5 \times 10^{15}$ | $2.5 \times 10^{16}$ | 2.41 | 0.34 | 2.95 |
| EXAMPLE 4 | V-0 | 30.5 | $4.3 \times 10^{15}$ | $3.1 \times 10^{16}$ | 2.43 | 0.32 | 2.85 |
| EXAMPLE 5 | V-0 | 30.5 | $6.2 \times 10^{15}$ | $4.0 \times 10^{16}$ | 2.51 | 0.35 | 2.90 |
| EXAMPLE 6 | V-0 | 30.5 | $5.1 \times 10^{15}$ | $3.3 \times 10^{16}$ | 2.43 | 0.33 | 2.93 |

TABLE 2

| Example | Carbonic Acid Ester | Bleeding tendency | Degree of bleeding (%) |
|---|---|---|---|
| COMPARATIVE EXAMPLE 2 | not used | yes | 2.56 |
| EXAMPLE 7 | 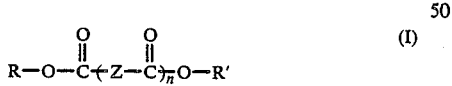 | no | 0.01 |
| EXAMPLE 8 | (phenyl-O-CO-O-phenyl) | no | 0.01 |
| EXAMPLE 9 | 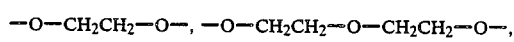 | no | 0.01 |
| EXAMPLE 10 | 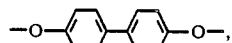 | no | 0.01 |

| Example | Fire Retardance UL-94 | Oxygen index (%) | Surface specific resistance (Ω) | Volume specific resistance (Ω · cm) | Dielectric constant | Dissipation factor (%) | Tensile strength (kg/mm²) |
|---|---|---|---|---|---|---|---|
| COMPARATIVE EXAMPLE 2 | V-0 | 32.0 | $3.4 \times 10^{15}$ | $6.7 \times 10^{16}$ | 3.11 | 0.38 | 2.78 |
| EXAMPLE 7 | V-0 | 31.0 | $3.5 \times 10^{15}$ | $7.5 \times 10^{16}$ | 3.05 | 0.43 | 2.70 |
| EXAMPLE 8 | V-0 | 31.5 | $3.1 \times 10^{15}$ | $8.2 \times 10^{16}$ | 2.73 | 0.53 | 2.65 |
| EXAMPLE 9 | V-0 | 31.0 | $4.5 \times 10^{15}$ | $7.1 \times 10^{16}$ | 2.93 | 0.56 | 2.75 |
| EXAMPLE 10 | V-0 | 31.5 | $4.0 \times 10^{15}$ | $6.1 \times 10^{16}$ | 3.05 | 0.61 | 2.68 |

What is claimed is:

1. A fire-retardant polyolefin composition, comprising:
   (A) a polyolefin,
   (B) from 1 to 40 parts by weight, as halogen, of an organohalogenous fire retardant per 100 parts by weight of said polyolefin and
   (C) from 1 to 5 parts by weight of carbonic acid ester per 100 parts by weight of said polyolefin, said carbonic acid ester being represented by formula (I):

$$R-O-\overset{O}{\underset{\|}{C}}\!-\!(Z-\overset{O}{\underset{\|}{C}})_n\!-\!O-R' \quad (I)$$

wherein n represents 0 or 1, R and R' each represent an alkyl group, an alkenyl group, an alkynyl group, a cycloalkyl group, an aralkyl group or an aryl group, and Z represents a substituent selected from the group consisting of $-O-CH_2CH_2-O-$, $-O-CH_2CH_2-O-CH_2CH_2-O-$,

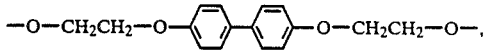,

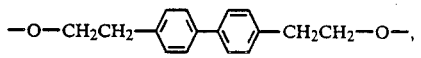,

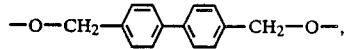,

-continued

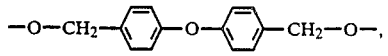,

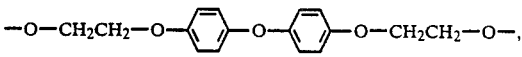,

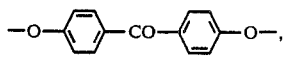,

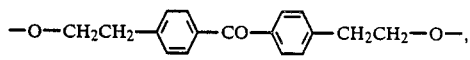,

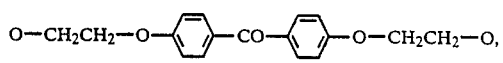,

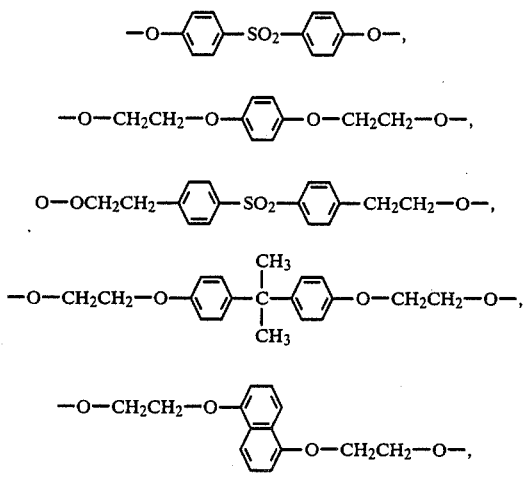
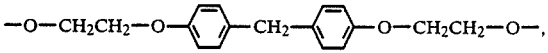
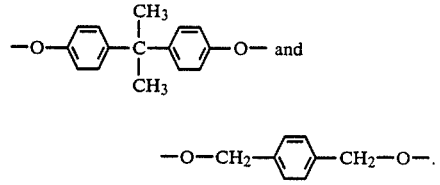
2. The fire-retardant polyolefin composition according to claim 1, wherein said carbonic acid ester is a member selected from the group consisting of
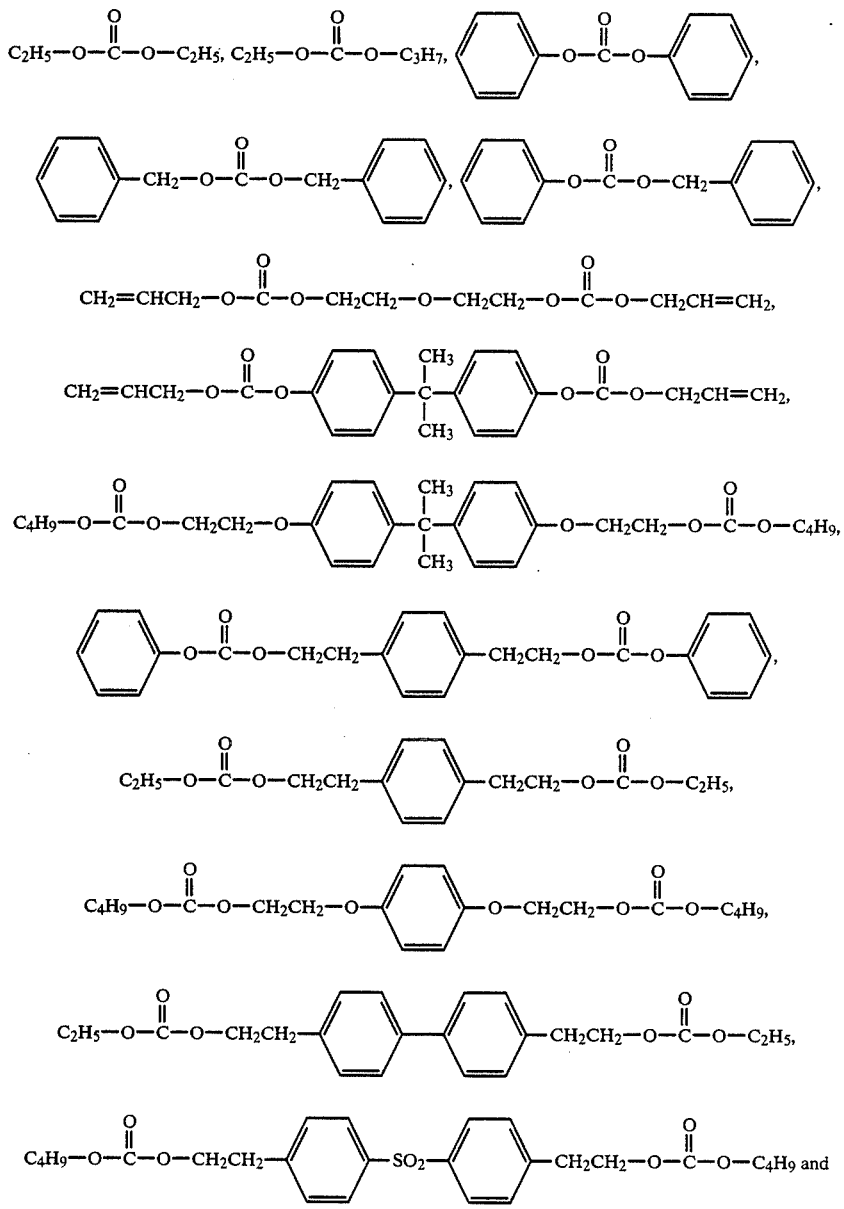

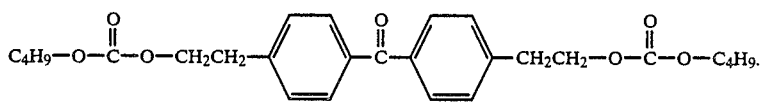

3. The fire-retardant polyolefin composition according to claim 1, wherein R and R' each represent a substituent selected from the group consisting of

—C$_2$H$_5$, —C$_3$H$_7$, —C$_4$H$_9$, —CH$_2$—CH=CH$_2$,

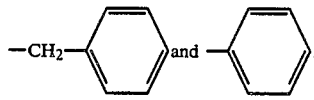

4. The fire-retardant polyolefin composition according to claim 1, wherein said alkyl group contains from 1 to 4 carbon atoms, said alkenyl group contains from 3 to 5 carbon atoms, said alkynyl group contains from 3 to 5 carbon atoms said cycloalkyl group contains from 3 to 6 carbon atoms, said aralkyl group is benzyl, α-naphthylmethylene or β-naphthylmethylene and said aryl group is phenyl, α-naphthyl or β-naphthyl.

5. A fire-retardant polyolefin composition, comprising:
(A) a polyolefin,
(B) from 1 to 40 parts by weight, as halogen, of 2,2-bis[3,5-dibromo-4-(2,3-dibromopropoxy)phenyl]-propane and tris(2,3-dibromopropyl)isocyanurate, per 100 parts by weight of said polyolefin, and
(C) from 1 to 5 parts by weight of carbonic acid ester selected from the group consisting of

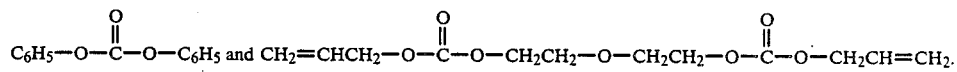

per 100 parts by weight of said polyolefin.

* * * * *